(12) United States Patent
Franks

(10) Patent No.: US 6,847,299 B2
(45) Date of Patent: Jan. 25, 2005

(54) IDENTIFICATION TAG FOR FINE ART REGISTRY SYSTEM

(76) Inventor: Theresa S. Franks, 4146 W. Banff La., Phoenix, AZ (US) 85053

( * ) Notice: Subject to any disclaimer, the term of this patent is extended or adjusted under 35 U.S.C. 154(b) by 40 days.

(21) Appl. No.: 10/286,481

(22) Filed: Nov. 1, 2002

(65) Prior Publication Data

US 2004/0044596 A1 Mar. 4, 2004

Related U.S. Application Data

(63) Continuation of application No. 10/232,919, filed on Aug. 30, 2002.

(51) Int. Cl.[7] ............................................. G08B 13/14
(52) U.S. Cl. .................................. 340/572.1; 235/493
(58) Field of Search ........................... 340/572.1, 572.6, 340/572.8; 235/487, 493

(56) References Cited

U.S. PATENT DOCUMENTS

| | | | | |
|---|---|---|---|---|
| 4,268,983 A | * | 5/1981 | Cook ........................... 40/630 |
| 5,838,253 A | * | 11/1998 | Wurz et al. ............... 340/572.1 |
| 5,895,075 A | * | 4/1999 | Edwards ....................... 283/81 |
| 6,095,567 A | * | 8/2000 | Buell ........................... 283/75 |
| 6,222,452 B1 | * | 4/2001 | Ahlstrom et al. ......... 340/572.1 |
| 6,265,977 B1 | * | 7/2001 | Vega et al. ............... 340/572.7 |
| 6,281,795 B1 | * | 8/2001 | Smith et al. ............. 340/572.1 |
| 6,297,727 B1 | * | 10/2001 | Nelson, Jr. ............... 340/572.1 |
| 6,520,544 B1 | * | 2/2003 | Mitchell et al. ......... 340/572.8 |

* cited by examiner

Primary Examiner—Thomas J Mullen, Jr.
(74) Attorney, Agent, or Firm—Donald J. Lenkszus, PC

(57) ABSTRACT

Labels for affixation to works of art, art objects, and other valuable items to uniquely identify the works for registration in a registration system and database is described. Each identification tag includes a secret identification code and a visually readable second identification code. The secret identification code is encoded in a magnetic medium readable only with a separate reader device.

27 Claims, 7 Drawing Sheets

| | |
|---|---|
| Identification No.: | 123456789abcdef |
| Artist: | John Doe |
| Title: | Old Master Study |
| Year Created: | 2001 |
| Medium: | Other |
| Width: | 11 inches |
| Height: | 14 inches |
| Weight: | 2.5 lbs |
| Theme: | undecided |
| Price: | US$250 |
| Description: | Pen & Ink- Old Master Study |
| Contact: | John Doe for more information about "Old Master Study", or for purchase information |

FIG. 4

SORT CATEGORIES

Identification Number
Artist
Style or Genre
Country
Title
Keyword/Description
Price
Medium
Size
Date/Century
Auction House
Stolen Items
Museum
Gallery
Antique Store
Theme
Ancient Art and Antiquities
Furniture and Decorative Art

FIG. 7

IDENTIFICATION TAG FOR FINE ART REGISTRY SYSTEM

CROSS-REFERENCE TO RELATED APPLICATIONS

This application is a continuation of Ser. No. 10/232,919, filed Aug. 30, 2002.

FIELD OF THE INVENTION

This invention pertains to registration and registration authentication systems, in general, and to labels for affixation to works registerable in such a registration and registration authentication system, in particular.

BACKGROUND OF THE INVENTION

One matter of extreme importance is the provenance of works of fine art. Although attempts have been made in the past to register and authenticate fine art and antiques, these attempts fail in that such systems are severely limited in scope, are inaccessible to the average consumer, and are subject to mistake, error and fraud. There exists no technologically advanced worldwide, fully automated, real time database for the use of the contemporary and secondary global fine art markets.

The provenance of fine art and antiquities is particularly important from a standpoint of valuation of works of art, especially as it relates to the contemporary artists. Up until the time of this invention, the secondary fine art market has been plagued with problems of provenance, especially as it relates to artists and/or makers of works who are deceased and are, of course, unable to verify for a prospective buyer or collector, that the work was made or done by their hand. Absent an unimpeachable database of provenance, the valuation of art is often a highly speculative venture.

A global central registry for fine art and antiquities does not exist today. The global Internet art community is at best only random. Thousands upon thousands of artists pepper the worldwide web offering their works for sale to the world on an endless number of web sites, large and small. The sheer number of works available for sale or acquisition at any given time is legion. There is no common place to market works of art, where artists, buyers and collectors can convene and trade in confidence.

The global art industry's control over the supply, production, sale and acquisition of art objects has long been plagued with a rapidly growing illicit trade, including fraud, forgeries, theft and counterfeiting. Law Enforcement agencies worldwide cannot adequately handle the vast number of reported cases and are without resources to investigate each one, especially as it relates to the antiquities industry. Therefore, the vast majority of these crimes are not investigated and ultimately the criminals go unpunished.

In many cases, it is often impossible for forgeries to be identified. The best art experts in the world have been fooled, not to mention the less skilled at detecting fakes and forgeries—millions of consumers. Contemporary artists have been cheated out of millions in profits due to the proliferation of fakes and forgeries.

Another important influence over the art industry is insurance. Historically, insurers relied on the insured's recollection of the contents of a home or business at the time of a loss, be it by theft or destruction.

A global infrastructure for identifying fine art and antiquities does not exist. However, with the Internet and availability of e-commerce, it would be highly desirable to utilize such capabilities to provide for the standardization of a worldwide catalogue of art.

SUMMARY OF THE INVENTION

In accordance with the principles of the invention, an art registration database is provided that includes a plurality of information entries. Each information entry comprises identification information of a work of art or art object, ownership identification information of the work of art or art object, image information of the work of art or art object, a secret identification code, and a non-secret identification code, both codes being unique to the work of art or art object.

Still further in accordance with the invention each information entry comprising a field for providing theft or forgery information or information pertaining to damage or destruction. Each information entry also comprises the signature, monogram, or mark (if applicable) of the artist of said work of art or art object and identification information of the current owner of said work of art or art object.

In accordance with a further aspect of the invention the owner identification information includes owner biometric information.

In accordance with another aspect of the invention each information entry includes current owner supplied identification information of the next subsequent owner of said work of art or art object to thereby provide an added level of security.

Yet further in accordance with the principles of the invention each information entry includes an information field for storing sale information for said work of art or art object.

In accordance with another aspect of the invention a method of managing works of art comprises providing an art registration system comprising a server system and database accessible via a worldwide network of computers. The method includes receiving "log-on" requests from a user; verifying the user as a legitimate user; and registering the legitimate user. The method further includes responding to a request from a legitimate user for an identification tag to be affixed to a work of art or art object; recording identification information for the work of art or art object in a database; and providing an identification tag to the legitimate user for affixing to the work of art or art object. The identification tag has a stored unique secret identification code readable only by a scanning device and has a visually readable second unique identification code associated therewith. The secret identification code is different from the second identification code. The method also includes the step of storing in the database the secret identification code, the second identification code; and identification information identifying the original work of art or art object and ownership of the work of art or art object.

The method of the illustrative embodiment utilizes at least one of the secret identification code or the second identification code on a work of art or art object to access said information from said database to determine registered authenticity of said work.

The method of the invention permits storing in the database alerting information pertaining to theft of the work of art or art object and providing said alerting information pertaining to theft of said work of art or art object in response to requests for information from said database.

The method includes scanning a work of art or art object to read therefrom a secret identification code; accessing the database to obtain stored information corresponding to the scanned secret identification code; and comparing the obtained information with the work of art or art object to authenticate the work.

In accordance with another aspect of the invention, identification tags are utilized. Each tag comprises a frangible, tamper resistant component upon which is stored the unique identification code.

In accordance with another aspect of the invention, an art registration system comprises a server accessible via a worldwide network and a relational database accessible via the server. The database is accessible only by registered users of the system. The server has access to security and identity verification software to verify the identity of each user as a registered user. The server is responsive to secret identification information to provide information obtained from the relational database pertaining to a work of art or art object. The information includes art identification information and owner identification information corresponding to the secret identification information.

The server is responsive to a request from a user to permit the user to order an identification tag for affixation to a work of art or art object. The server is operable to interact with the user to obtain identification information for said work of art or art object and storing the identification information in the relational database. The server is operable to store ownership information in the relational database for the work of art or art object.

The server utilizes at least one of the secret identification code or a second identification code on a work of art or art object to access information from the database. The server utilizes the second identification code to obtain the information corresponding to the second identification code.

For the first time ever, it will be possible to connect the spokes of the art world, using a methodology architecture of database information to align all artists, collectors, institutions, corporations, governmental agencies, insurers, and other professionals.

The art registration of the invention provides to the art industry a system to track, identify, secure, record ownership, record provenance, record place or point of origin, record and/or historically classify, record physical location, and physically describe, and record lost, stolen and forged objects of art, including but not limited to contemporary art and all art objects, creative works, and collectibles and/or any item of value, excluding live animals or humans.

In accordance with the invention a technologically advanced, worldwide, fully automated database for the immediate use and benefit of the global fine art and antiquities industry is provided. The system and method of the invention establishes the art world's first and largest, publicly shared network database.

The database of the invention has the remarkable potential to significantly reduce the impact of parallel trading. It provides a means for proving quickly and conclusively that an object of art being consigned to a sale is a fake or perhaps stolen or forged. The identification tag which is either completely embedded into or onto a work of art or art object, and invisible to the naked eye is connected to a numeric identity that is stored in the system database.

In accordance with the principles of the invention, a state-of-the-art system and method for building a "smart or intelligent art management infrastructure" is provided. In an embodiment of the invention, magnetic tag technology is used to identify fine art, antiquities, valuables, and cultural assets, (hereinafter referred to collectively as "ART") and to provide registration information through an e-commerce Internet site for the purpose of tracking, mapping, integrating, and physical networking of all retail, commercial, private, and public works of art or antiquities.

Further in accordance with the invention an identification tag is assigned a factory, preprogrammed number. These numbers will be issued and/or assigned to registered users at the time of "on-line" purchase. The assigned numbers will directly correspond to the data or information input by the user. The tags purchased by the user will be shipped to the user for application directly to the work of art or art object to be registered.

Benefits of registering art objects with the system of the invention are many. For example, a contemporary artist may immediately and automatically create provenance on a newly created piece that permits easy identification and tracking of the artist's unique works of art forever. In addition registration provides the favorable sales advantage of having an instant database available to the artist of the chain of record or ownership of the piece.

Using the numerical identity information from the reader/scanner, a piece in question can be logged into the art registration database from which vital and pertinent information regarding the piece can be accessed, proving quickly and conclusively to whom the art object belongs, by providing information such as serial number, a photograph of the item, point of sale, the country in which it was created, the artist, whether or not it has been reported as stolen, forged, or lost, along with other unique identifying characteristics.

The art registration database empowers artists, museum curators, gallery owners, law enforcement, insurers, and countless consumers with the ability to know whether an art object is counterfeit or stolen.

The architecture of the universal system of the invention makes it possible to read an identification tag and identify the work or valuable anywhere in the world, instantly.

Art theft and forgery investigation has developed into a 1.3 billion dollar problem worldwide. No system in the world can completely eradicate art-related crime, but it is believed this invention will be embraced and accepted worldwide.

BRIEF DESCRIPTION OF THE DRAWING

The invention will be better understood from a reading of the following detailed description taken in conjunction with the drawing figures, in which like reference designators are used to identify like elements, and in which:

FIG. 4 illustrates a database listing;

FIG. 7 is a table of sort categories for accessing database information; and

DETAILED DESCRIPTION

The system and process of the invention is a revolutionary method of capturing and cataloguing information into a specially designed global network database. Identification tags are assigned for all works of art and art objects including antiquities and other valuable items. Each identification tag has a unique, pre-programmed passive embedded identification code. In the preferred embodiment described herein, the identification tags are passive magnetic devices that include the identification code. It is anticipated that the process will become universally known in the worldwide art industry. It is also anticipated that other technologically advanced magnetic identifiers may be developed in the future that may similarly be utilized to uniquely identify each work of art or art object, so that information for such work or object may be entered into a central database making a permanent record for art works and objects worldwide.

Prevention is always key in any criminal activity. Up until now, no universal networking system existed to monitor the art industry, and little could be done to prevent theft, fraud, or forgeries. The system of the present invention will greatly discourage and substantially deter art-related criminal activity.

The system and database of the invention will also encourage the linking together of numerous governmental agencies worldwide into a network cooperative. The system and database of the invention allows the posting of lost, stolen and forged works of art for all to the world to see. It is anticipated that valuable pieces of art will be successfully recovered as a result.

Another tremendous benefit of my invention is the streamlining of the art and valuable contents sector of the insurance industry. The system and database of the invention provides insurance carriers worldwide with a powerful tool for investigation into art-related theft and fraud as well as accessing critical data relating to valuables destroyed in a fire, flood or other disaster.

The system and database of the invention will simplify the entire contents insurance claims process. An authorized user of the system can easily extract all information on any art or valuable registered into the database of the invention via Internet access at any time. The system, method and database of the invention will likely make a difference in the way insurers write and underwrite their policies leading to across the board reduction of losses due to theft, forgeries, or disasters. Insurers are also likely to offer discounts in premiums if valuables are registered in accordance with the invention.

Figure 1:
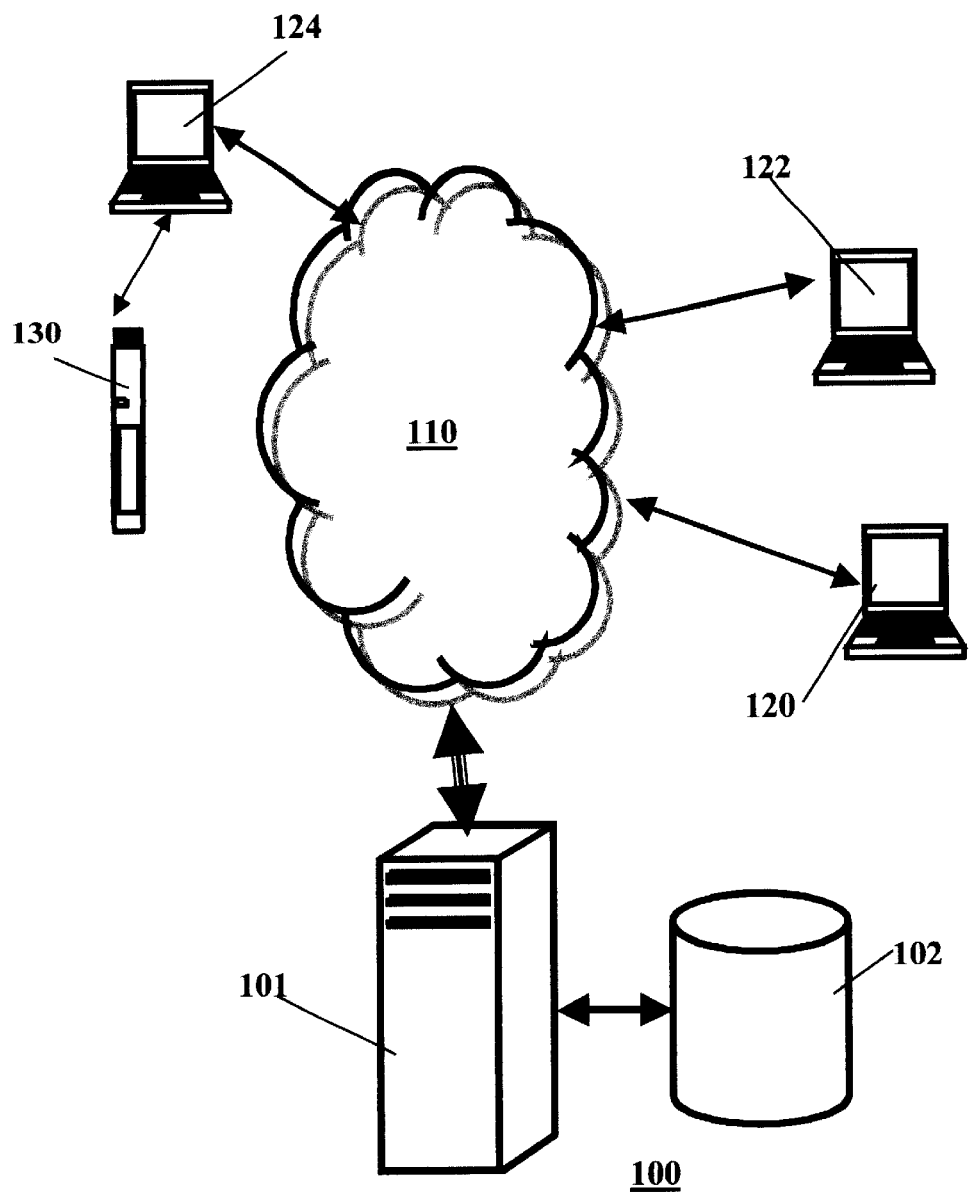
FIG. 1 is a block diagram of a system in accordance with the invention.

Turning now to FIG. 1, system 100 of the invention includes a server 101 and database 102 coupled to a public accessible worldwide network such as the Internet 110. Users may log onto system 100 from Internet accessible devices such as computers 120, 122, 124. It should be noted that the invention is not limited to the use of computers as devices for accessing the system, but may include any type of device that has network access ability, including, but not limited to, telephones, cellular phones, personal digital assistant (PDA) devices, computers, and specialized devices. One such specialized device may be a reader 130 for the identification tags. Reader 130 is used to provide either a full or partial read of information encoded on an identification tag. Reader 130 may have access to the interconnecting network or Internet 110 either via a computer or Internet device 124 or it may have direct connection to the Internet. Reader 130 will be described in greater detail below.

Upon logging onto the system 110 or an Internet web site maintained in accordance with the invention the individual or authorized representative will begin by registering on the site. The user will be issued a user name and unique password, which the user will have the option of changing at any time. The user may then purchase identification tags. At that time, the user will be required to enter information into a custom designed e-commerce database form. The database form is utilized to capture all relevant information specific to the work of art or art object.

Figure 2:
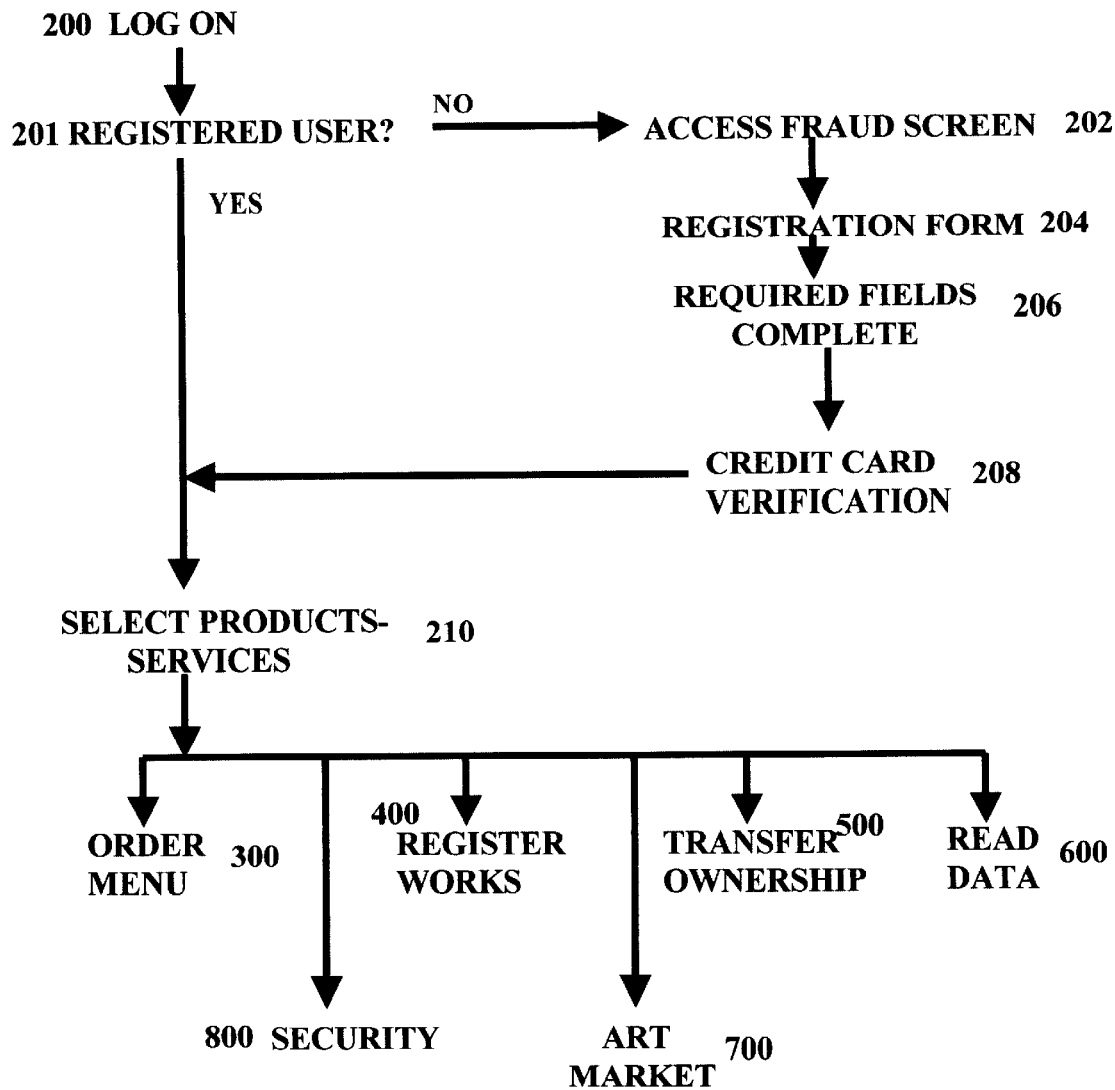
FIG. 2 is a flow chart illustrating operation of the system of the invention.

As shown in FIG. 2, upon logging on to system 100 as indicated at step 200 an initial determination at step 201 is made as to whether or not the party logging on is a registered user or not.

Registered Users include individuals, artists, authorized and registered representatives of galleries, museums, associations, universities and colleges, insurance carriers, governmental entities and agencies, private and public associations and organizations, and law enforcement agencies.

Fraud screening is provided at step 202. A secure server is utilized, such as those commercially available through Verisign, and a commercially available fraud screening service is utilized to distinguish between legitimate users or purchasers and fraudulent users or purchasers in real-time. An online real-time registration form appears at step 204 and the artist or other user fills in the information fields at step 206. The information fields include required fields such as name, address, phone number and email address. At this time, the registrant will create their personal and secure user identification and create their password. The password will be entered twice to assure that typographical errors do not occur.

If the required fields are not complete, the registrant will not be able to proceed to the next step of the process.

As part of the registration, verification with valid credit card is required at step 208, and is also entered via a secure server.

After the credit card is verified, the artist Registrant is permitted to choose products and/or services by entering his name and password as indicated at step 210. The selectable products/services include an order menu 300, registering a work 400, transfer of ownership of a work 500, reading of stored data 600, accessing the art market 700 and the security features 800.

Figure 3:
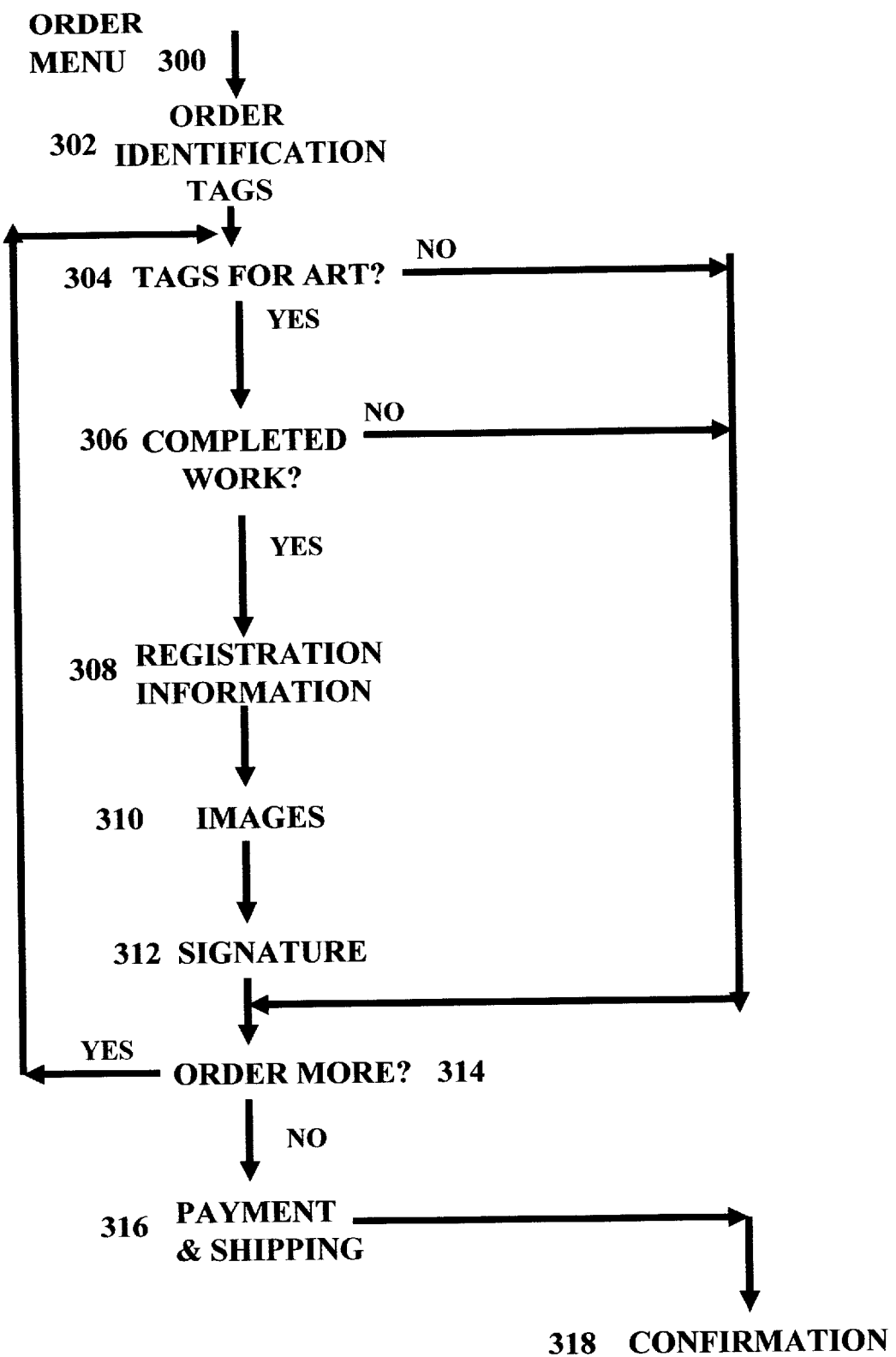
FIG. 3 is a flow chart of an order menu in accordance with the invention.

Turning now to FIG. 3, if the user has selected the order menu, the user may order identification tags as indicated at step 302. In the illustrative embodiment of the invention identification tags may be ordered for works of art or for affixation to certificates and documents such as rare books, manuscripts, and contemporary certificates of authenticity. The selection of the use of the identification tags occurs at step 304.

All information and data will be entered at the sole discretion of the user. All information entered into the database (with the exception of selective data that a specific user may not want disclosed or sensitive items that may be under investigation for theft or forgery) will be available to all registered users for research and identification purposes. System 100 will store, archive, disseminate (if appropriate), in database_102. If identification tags are being ordered for works of art, then at step 306, a determination is made as to whether the work is a completed work of art or not. At step 308 all crucial and critical data related to the artwork is entered and stored in database 102. An image of the work such as a scanned photograph of the artwork being registered is required at the time of order and posting and is entered at step 310. In addition, if the artist is registering a work for the first time an image of the artist's signature is also requested from the artist and stored in database 102 at step 312. At step 314 a determination is made whether or not additional tags are to be ordered.

Representative examples of the type of information to be stored and accessed are:

a. Origin and artist, or maker of the item.
b. Date Item was acquired and/or purchased at Auction or Sale House.
c. Date Item was acquired and!or purchased from Artist, Museum, Gallery, Antique Store, Art Fair, or from any other individual or entity.
d. Condition of Item.
e. Name, Address, and telephone number of present owner.
f. Name, Address, and telephone number of all previous owners.
g. Title of Item.
h. Detailed description of Item.
i. Medium or Materials (whether man-made or existing in nature, wood, fur, paint, pastel, crayon, canvas, paper used to create, or build the item.
j. Distinguishing marks or signatures of or on the item.
k. Photographs of the Item sufficient enough to fully identify item in case of theft or if lost.
l. Theft, fraud, and damage or destruction information.

FIG. 4 illustrates a record of information stored in database 102 for one work of art or art object. In addition to the information shown in FIG. 4, an image file of the work of art or art object and an image file of the artist's signature are stored. The artist will be required to submit two digital images of the work. The digital images include, for example, the front and back of a painting. One of the images should include a clear digital image of the artist's signature. The digital images of the work may be watermarked for digital asset copyright protection. It should be noted that the database information is stored in encrypted form as a greater level of security±

If an artist or owner with registered works of art wishes to remain anonymous, any personal information on that artist will remain private. If a prospective researcher, or other party interested in the artist's work wishes to contact the artist and make an inquiry for information, the inquiring party via art registration secure server can send an email to the artist or owner. It will be in the artist's sole discretion whether they choose to respond to the email inquiry. If the option of "information unavailable" is chosen by artist, at no time will the artist's or owner's name, or other personal information be accessed, other than the photograph of the subject art and its registration number, securing the privacy of the artist.

Once the user has completed the data entry process to the user's satisfaction, system 100 will automatically cause to be issued to the user, the requisite quantity of Identification codes.

Once registration of the works is complete, the artist will be prompted for payment and shipping options at step 316. Payment will be made over secure server. Artist will then be issued confirmation of their order via email at step 318.

The artist's order will be verified by system 100 and the identification tags will be issued with a unique coded identification code and shipped to artist according to the artist's chosen shipping option. It is the artist's responsibility to appropriately tag the art. The tag is designed to adhere to most any surface. The artist will independently determine the placement of the identification tag on the artwork. The versatility of the registered identification tag allows the artist freedom to place the identification tag virtually anywhere on the piece of art that they deem appropriate.

System 100 assigns identification tags having specific and unique Identification codes (each preprogrammed with a unique code, which may represent a number or combination of numbers, letters or symbols, for example) that will be provided to the user. The identification tags can be easily applied, embedded or affixed to the registered item(s). The shape, size and package of the identification tags can be uniquely manufactured to fit almost any specified art object.

The identification tags can be ordered for blank canvases, board, paper, or any other material on which an artist may create a work of art or art object. The codes are issued under the registered user's name and other identifying information, but the work will not be considered fully registered and adequately registered with the system and database of the invention until the registered user of the piece enters other required data after the work is completed.

If at step 304 it is determined that the identification tags are being ordered for certificates, or if at step 306 it is determined that the artwork is not complete then detailed registration information is not obtained, nor are images or signatures. Instead, the number of identification tags requested is reserved in the name of the user, payment is made at step 316 and the information relative to the reserved tags is stored in database 102.

Works of art that have been registered may be listed on system 100 for sale. However, the owner of the works permitted to be listed or sold en via the system of the invention must be a registered user and the works must carry identification codes and be registered with the system of the invention. Individuals may register for the sole purpose of purchase of artwork only. Turning back to FIG. 2, the user of System 100 may enter the art market 700 to either list registered works for sale, or to register as a browser for purchasing works.

Once the identification code is embedded in, applied or affixed to the item, the information about the item will be stored for the life of the item, including all changes to ownership or lawful acquisition or possession of the item in the custom designed database. Change of ownership, location, condition, or any other remarkable changes in or to the item can be updated at anytime, as long as a registered user is the authorized owner or legal representative given authority to access the database.

If an artist orders identification tags for future works not yet complete, the artist will be required to return to the database to register completed work. Identification tags without complete identification and registration will not be available on the database and cannot be listed for sale on the web site.

After works are registered by artist, the artist is free to list for sale the registered artwork on the art registration system official web site. Prospective registered buyers are then free to contact the artist regarding sale of the artwork. The art registration system of the illustrative embodiment does not act as an agent for the artist, and does not collect commission charges on the works, nor does the art registration system have any involvement with the exchange of compensation to the artist for the work. The art registration system of the invention of the illustrative embodiment is a forum for which the artist can showcase the work.

Once an artist or owner sells a work of art or art object, whether by showcasing it on the art registration system or otherwise, the seller can transfer the title to the work of art or art object to the new buyer. The new owner of the work will not be able to access information on the work transferred until the new owner is a registered user of the art registration system. Once a new owner is registered the change of ownership in title can be completed electronically, in real time.

In order for the transfer of ownership to be registered, the artist or, if appropriate, the current owner must be registered with art registration system 100. The party transferring the work of art or art object selects the transfer ownership option 500 after logging onto system 100 as shown at FIG. 2. The party transferring ownership of a registered work of art or art object must identify the party to whom the work is transferred. The party to whom ownership of the work is transferred may then register the change of ownership provided that the transferee owner registers with system 100.

Like contemporary users of system 100, if the registered user of the secondary art collection wishes to remain anonymous, the information will remain private. If an interested party in collected art wishes to contact the collector of the artwork or make an inquiry for information, the inquiring party, via a secure server, can send an email to the collector. It will be in the collector's sole discretion whether or not to respond to the email inquiry. If the option of "information unavailable" is chosen by a collector, at no time will the collector's name, or other personal information be accessed, other than the photograph of the subject art and its registration number, thereby securing the privacy of the collector.

In accordance with the principles of the invention, a robust system, database, method of art management tagging, tracking, and identification utilizing remote identification tag reading conveniently provides "cradle to grave" history of an art object to be recorded. The identification code utilized, in the illustrative embodiment, is an 8 to 15-digit number that identifies an artist's work or body of work for purposes of commerce and source chains.

In the illustrative embodiment of the invention, thin film magnetic identification tags are utilized. A unique identification code is magnetically encoded onto each thin film tag. The thin film tags are approximately one fiftieth of a millimeter thick. The identification code stored on an identification tag can be read by a portable scanner from a distance of one-quarter inch. The codes can be tightly packed into the tags that can be buried in art objects and incorporated into new original works of art, including art packaging materials for shipping and packaging works of art. The tags can be used under the most extreme conditions and survive high temperatures and pressures where other systems would likely fail. Each identification tag has the capacity to encode one out of 32 million unique codes.

Figure 5:
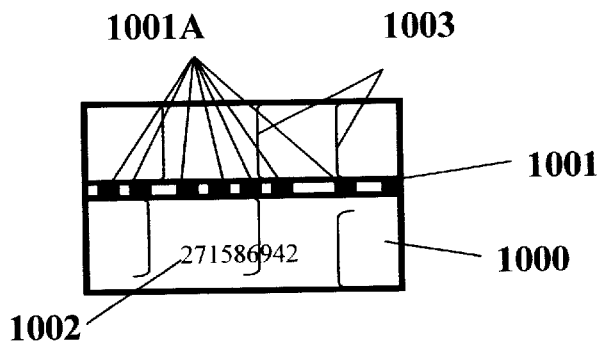
FIGS. 5, 5A and 5B illustrate an identification tag front view, side view and front view showing a visual identification of a registry in accordance with the invention.
Figure 5A:
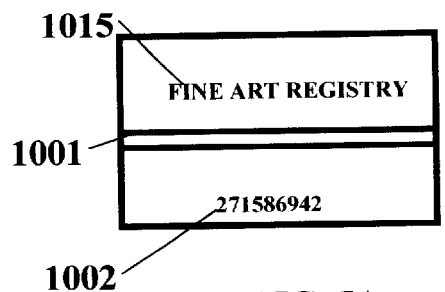
Figure 5B:
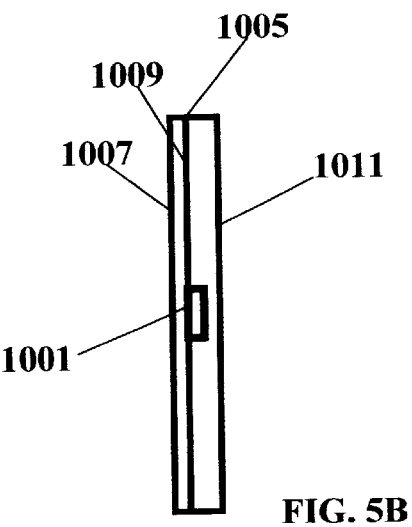

In the illustrative embodiment, magnetic identification tags of a type that are commercially available are utilized. The tag is a very small magnetic tag only a few centimeters long which can store a wealth of information that can be read at distance using a simple hand-held scanner. One such tag 1000 is shown in FIG. 5. Tag 1000 includes a unique magnetically coded identification code stored in magnetic media 1001. Magnetic media 1001 includes a plurality of magnetically active regions or magnetic zones 1001A arranged as a linear array as shown in FIGS. 5, 5A, and 5B. Although only one linear array of magnetic media 1001 is shown. it will be apparent to those skilled in the art that additional such linear arrays of magnetically active regions may be utilized. In addition, tag 1000 includes a human readable second identification code 1002. Identification tag 1000 includes a plurality of layers including at least an identification tag portion or first layer 1005 having a first surface 1007 and a second surface 1009. The identification tag portion or first layer 1005 carries a visual identification of the registry 1015 where the work is registered. An adhesive layer 1011 is carried on surface 1009 so that label 1000 it may be affixed to works of art. As an extra security aspect, identification tag 1000 further is designed so that its identification tag portion or first layer 1005 is a thin laminar sheet that is frangible such that any attempt to lift or remove identification tag 1000 from a work of art or document to which it is attached will result in mutilation of the identification tag. Tag 1000 includes cuts 1003 that make the tag frangible.

Figure 6:
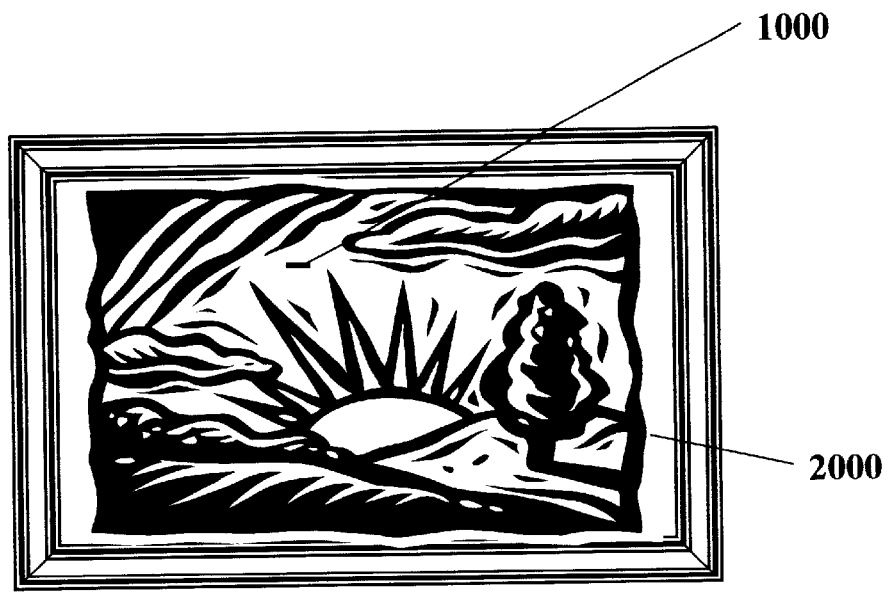
FIG. 6 is a representative work of art or art object to which the tag of FIG. 5 has been attached.

Once the tag is affixed to the object of art, it remains as a permanent characteristic of the art object for life and so does the information contained in database 102 that is unique to the piece. As shown in FIG. 6, an identification tag 1000 is affixed to the canvas of painting 2000. Identification tag 1000 is small enough so that it can be affixed to a canvas before the artist begins painting the canvas. In addition, identification tag 1000 may be affixed to the front of a canvas and painted over to make its affixation to the painting imperceptible without an identification tag reader. The magnetic identification tag has incredible resistance to heat and pressure allowing it to be applied to or embedded into virtually any work of art that is non-metallic. Tags can also be placed on non-ferrous metals. Works of art with the materials of bronze, silver and gold can be tagged, as well as nickel, and gemstones.

As noted above, in addition to the magnetically encoded identification code 1001, the magnetic coded tag 1000 includes a pre-printed identification code 1002 issued and confirmed by the art registration system 100 at the time of registration of the artwork Pre-printed code 1002 can easily be read with the human eye. The visible code 1002 on each tag 1000 is different from the magnetic code 1001 on tag 1000. Each magnetic code 1001 remains "classified" or is maintained in secret and will not be revealed to the artist or others. And, importantly, as an added security measure, the "classified" or "secret" code will be maintained in an offline database and will not under any circumstances be available online from real time database 102, thereby insuring another layer of security. The magnetic code 1002 is what connects or associates the work with the individual or entity registering the work from the point of creation and forever thereafter. The magnetic code 1002 is not detectable by the human eye, thereby adding an incredible second layer of security and value to the registered piece.

The magnetic identification codes 1001, in the illustrative embodiment, are eight to fifteen digits in length. Codes of other lengths may be utilized.

Registered identification tags 1000 are an invaluable source of art management and control for the contemporary artist. An artist who tags his entire original collection, will have management control and real time database access to those who purchased the artist's work and will be empowered like never before, adding a whole new dimension to web based marketing for the artist, as well as a level of art management and security never before enjoyed in the art industry. Further, the artist has a published historical archive of each and every work registered. Importantly, due to its magnetic nature, identification tags 1000 can be read without line-of-sight so that each tag 1000 can be buried or hidden in packaged artwork, as well as canvas, panel, paper, textiles and scores of other art materials, allowing a permanent solution to tracking, tracing, and protection.

A gallery or an auction house with an identification tag reader will be able to instantly identify whether a consigned artwork is registered with the art registration system by a using a hand-held reader which will confirm or deny whether a contemporary piece of artwork contains the art registration identification tag, or by entering the human readable code into the art registration system's interactive, real time worldwide networked database. The tags are magnetically neutral tags that are easily coded with information that can then be read only with a hand held reader. For security reasons, the reader available for general sale will be programmed to confirm only that the tag is an "authentic" identification tag. The "classified" or "secret" code will not be made available to anyone with a generally available reader.

The identification tag can be read remotely through cardboard, paper, wood, fur and other materials. The artist can conceal a tag, for example by placing the tag on a blank canvas and painting over it in any medium available, thereby completely hiding the tamper resistant tag. Or maybe the artist chooses the back of the canvas or a panel or paper on which to attach the registered tag. The placement possibilities are limited only by the artist's imagination. Even if a thief were to discover the tags, the thief would literally have to damage or destroy the art object in order to remove the tag, thereby rendering the work worthless, damaged, and/or undesirable for resale. This ensures that any interference, corruption, or tampering with the tag on the artwork will be detectable. The identification tags are secure, making unauthorized duplication virtually impossible.

In many cases, proving that an artist's work has been molested, altered or tampered with can be difficult if not impossible, especially in the case of forgeries. Many fakes, reproductions, and forgeries, look identical to the original, meaning that even experts have trouble distinguishing them. The frangible tamper resistant component manufactured into the tag will make it impossible for all traces of the tag to be completely removed. In the event that the tag on a registered work of art or art object had been removed, the tag will be fragmented making reapplication of the tag extremely difficult, if not impossible.

Historically, the global second hand art market has been shrouded in mystery, and is one of the most difficult and sinister areas of the market to monitor and evaluate. A primary reason is that there are no controls over the market. The ground-breaking significance of the present invention systemizes and amasses the hundreds of thousands of holdings of collected art works for the benefit of the global art market including, collectors, museums, galleries, corporations, and universities. The database of the present invention provides an organized body of related information that profiles art works in collections worldwide.

For the global secondary art market, system 100 and database 102 will follow the same steps as outlined above for contemporary artists and new works. A private collector, gallery, or museum, for example, can now manage art portfolios or collections effectively and efficiently. The art registry's robust art management database, tagging, tracking, and identification system utilizes remote code reading of identification tags that conveniently allows the art collector, gallery, museum, university, and other entities, a proactive approach in accurately cataloguing their respective inventories and collections to create an important history of the art as it exists today, and the ability to protect against thefts and forgeries.

Just like the contemporary artists, a non-artist registered user can register and catalogue each piece of art in a collection. Thus, private collectors and museums and art galleries may register entire collections. Once a collection is registered, the user may list the art for sale in the gallery.

Although the present invention is applicable to nearly any inanimate art object, one primary area of its applicability is to provide the fine art community with a secure and vital method to accurately access information on art object(s) registered with an Identification code.

The present invention offers a global solution in fine art sales and management and will positively impact law enforcement and the insurance industries. The process is a significant breakthrough in the endless and increasingly sophisticated campaign against fraud, theft and other mechanisms of loss. The fundamental principle forming the basis of the process takes the provenance of art to a whole new technological level.

Registration in accordance with the principles of the invention provides for passively tracing and tracking a work of art or art object from the day it was created, purchased or acquired and will follow that piece forever thereafter.

By utilizing Internet access to system 100, all aspects of the invention may be performed globally, and literally at any location or place on the globe that has access to a computer and the Internet and/or a digital reader. And the greatest advancement is that the object(s) or item(s) being marked may be marked and registered where they are located.

For example, museums, collectors and insurers are greatly benefited by the ability to permanently mark an entire collection, and such ability is especially attractive to those providing art exhibitions. Once the item is identified by an identification code, the item is identifiable by the identification code for the life of the piece. Registering entire collections will benefit museums, galleries, and large private collectors. It is a quick and easy process, all with just the click of a mouse and the touch of keyboard.

The system of the invention comprises a significant contribution to enhancing consumer confidence in fine art purchases and will reduce across the board, crime associated with the fine art industry.

Identification tags can by applied to nearly all valuables such as, paintings, watercolors, pastels, canvas, paper, board, wood, fiber, furs, sculptures, rare coins, stamps, gems and jewelry as well as a broad range of other valuables, like furniture, textiles, and rare books and manuscripts—really only limited by one's imagination.

Identification tags of a type that may be advantageously employed in the present invention may utilize magnetic encoding technology as well as readers for such technology. Examples of such technology and readers are shown and described in U.S. Pat. Nos. 6,373,388; 6,371,379; 6,329,916; 6,323,770; 6,323,769; 6,204,766; 6,144,300; and 5,965,214, the disclosures of which are incorporated herein by reference. All of the foregoing patents describe the use of materials that are magnetic in conjunction with scanners for reading codes.

The database of the invention is used to store enough information relative to each work of art or art object to facilitate searching for individual pieces or collections based on multiple criteria. FIG. 7 shows the various search criteria that may be used to identify works that have been registered.

Figure 8:
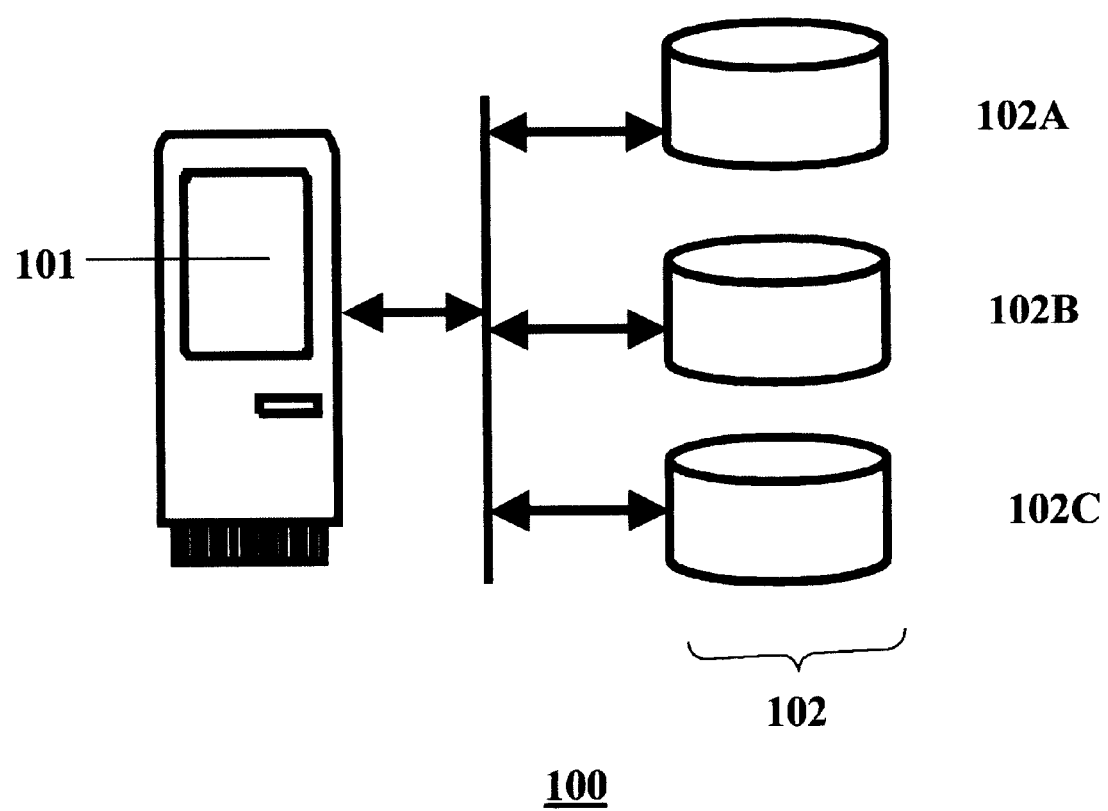
FIG. 8 is a block diagram of a server and database in accordance with the invention.

The ability to provide searching criteria over a number of different criteria is made possible in the illustrative embodiment system 100 by use of a plurality of relational databases 102A, 102B, 102C as shown in FIG. 8. The relational database structures may be of types known in the art and they work with a server structure 101. Server structure 101 is shown as one unit of hardware. It should be apparent to those skilled in the art that other hardware and software configurations may be utilized. In any event, the database structure utilized permits retrieval by any of the criteria shown in FIG. 7.

Turning now to FIG. 8, art registration system 100 comprises a server 101 accessible via a worldwide network as shown in FIG. 1 and a relational database 102 accessible via server 101. Database 102 is accessible only by registered users of the system. Server 101 has access to security and identity verification software to verify the identity of each user as a registered user. Server 101 is responsive to secret identification information from a work of art or art object to provide information obtained from relational database 102 pertaining to a work of art or art object. The information includes art identification information stored in database 102A and owner identification information stored in database 102B corresponding to the secret identification information. The information further includes the unique identification codes associated with each work of art or art object stored in database 102C.

Server 101 is responsive to a request from a user to permit the user to order an identification tag for affixation to a work of art or art object. Server 101 is operable to interact with the user to obtain identification information for said work of art or art object and storing said identification information in relational database 102. Server 101 is operable to store ownership information in relational database 102 for the work of art or art object.

Server 101 utilizes at least one of the secret identification code or a second identification code on a work of art or art object to access information from database 102. Server 101 utilizes the second identification code to obtain the information corresponding to the second identification code.

In one embodiment of the invention, biometric information for a user may be utilized to access database 102. The biometric information may include a retinal scan device, a finger print reader, a facial feature reader, voice recognition or other biometric information reader. The appropriate biometric device is coupled to the Internet device such as computers 120, 122, 124 as shown in FIG. 1.

As used herein, the term "authentication" and its derivatives shall mean the verification of the official registration with system 100. Official registration does not guarantee, warrant, nor confirm that a particular work of art or art object is by the registered artist's hand, especially as it relates to the secondary market.

The invention has been described in terms of specific embodiments of the invention. Those skilled in the art will understand that various changes and modifications may be made to the illustrative embodiment of the invention without departing from either the spirit or the scope of the invention. It is not intended that the descriptions of the various embodiments limit the scope of the invention. It is intended that the rights granted under the patent that issues on this patent application be limited only by the claims appended hereto. It is further intended that the scope of the invention be given the broadest coverage permitted under the law.

What is claimed is:

1. An identification tag for affixation to objects, said identification tag comprising:
   a stored first unique identification code carried by said identification tag and readable only by a magnetic scanning device, said first unique secret identification code not being directly visually readable;
   a visually readable second unique identification code carried on said identification tag, said second unique identification code being different from said second identification code; and
   an adhesive layer on one surface of said identification tag for permanent affixation of said identification tag to an object.

2. An identification tag in accordance with claim 1, wherein:
   said first unique identification code is encrypted.

3. An identification tag in accordance with claim 1, comprising:
   a first medium having said first unique identification code embedded therein; and
   an identification tag portion carrying said first medium.

4. An identification tag in accordance with claim 3, wherein:
   said identification tag portion comprises a first surface carrying said adhesive layer.

5. An identification tag in accordance with claim 4, wherein:
   said identification tag portion is configured to prevent removal in one piece from an object to which said identification tag is affixed by said adhesive layer.

6. An identification tag in accordance with claim 5, wherein:
   said identification tag portion is configured to be frangible.

7. An identification tag in accordance with claim 6, wherein:
   said identification tag portion comprises a second surface opposite said first surface.

8. An identification tag in accordance with claim 7, wherein:
   said second surface carries said second unique identification code.

9. An identification tag in accordance with claim 3, wherein:
   said medium comprises a magnetic medium.

10. An identification tag in accordance with claim 9, wherein:
    said first unique identification code is encrypted.

11. An identification tag in accordance with claim 10, wherein:
    said identification tag portion comprises a thin laminar sheet carrying said magnetic medium.

12. An identification tag in accordance with claim 11, wherein:
    said thin laminar sheet is configured to be frangible.

13. An identification tag in accordance with claim 11, wherein:
    said adhesive layer is carried on one surface of said thin laminar sheet.

14. An identification tag in accordance with claim 11, wherein:
    said second unique identification code is carried on a surface of said thin laminar sheet.

15. An identification tag in accordance with claim 14, wherein:
    said second unique identification code is carried on a first surface of said thin laminar sheet; and
    said adhesive layer is carried on a second surface of said thin laminar sheet.

16. An identification tag in accordance with claim 11, wherein:
    said thin laminar sheet comprises at least one of a paper layer or a plastic layer.

17. An identification tag for affixation to an object, said identification tag comprising:

a plurality of layers;

a first one of said layers comprising a medium configured to permanently store an encoded first unique identification code, said first unique identification code not being readable by visual inspection of said identification tag;

a surface of one of said layers bearing a second unique identification code readable by visual inspection of said identification tag;

one of said layers comprising an adhesive layer, said adhesive layer comprising an adhesive for permanent affixation of said identification tag to an object; and said surface carries a visual identification of a registry.

18. An identification tag in accordance with claim 17, wherein:

said identification tag is configured to be frangible.

19. An identification tag in accordance with claim 17, wherein:

said medium comprises a magnetic medium.

20. An identification tag in accordance with claim 17, wherein:

said medium comprises a magnetic marker carrying a predetermined arrangement of magnetic elements, said magnetic tag or marker being susceptible to interrogation by applying a magnetic field to said identification tag and detecting the magnetic response of said magnetic elements to generate a response indicative of the magnetic properties of the tag or marker and hence indicative of said encoded first unique identification code.

21. An identification tag in accordance with claim 20, wherein:

said magnetic marker comprises a plurality of magnetic zones said magnetic zones capable of producing a magnetic field pattern selected so as to be readable with suitable configured apparatus.

22. An identification tag in accordance with claim 20, wherein:

said magnetic marker comprises a substrate carrying a plurality of discrete magnetically active regions disposed in one or more linear arrays.

23. An identification tag for affixation to an object, said identification tag comprising:

a plurality of layers;

a first one of said layers comprising a medium configured to permanently store an encoded first unique identification code, said first unique identification code not being readable by visual inspection of said identification tag;

a surface of one of said layers bearing a second unique identification code readable by visual inspection of said identification tag;

one of said layers comprising an adhesive layer, said adhesive layer comprising an adhesive for permanent affixation of said identification tag to an object;

said plurality of layers being configured such that at least said one of said layers is frangible; and said identification tag carries a visual identification of a registry.

24. An identification tag in accordance with claim 23, wherein:

said medium comprises a magnetic medium.

25. An identification tag in accordance with claim 23, wherein:

said medium comprises a magnetic marker carrying a predetermined arrangement of magnetic elements, said magnetic marker being susceptible to interrogation by applying a magnetic field to said identification tag and detecting the magnetic response of said magnetic elements to generate a response indicative of the magnetic properties of the magnetic marker and hence indicative of said encoded first unique identification code.

26. An identification tag in accordance with claim 25, wherein:

said magnetic marker comprises a plurality of magnetic zones, said magnetic zones capable of producing a magnetic field pattern selected so as to be readable with suitable configured apparatus.

27. An identification tag in accordance with claim 25, wherein:

said magnetic marker comprises a substrate carrying a plurality of discrete magnetically active regions disposed in one or more linear arrays.

* * * * *